United States Patent Office
3,508,904
Patented Apr. 28, 1970

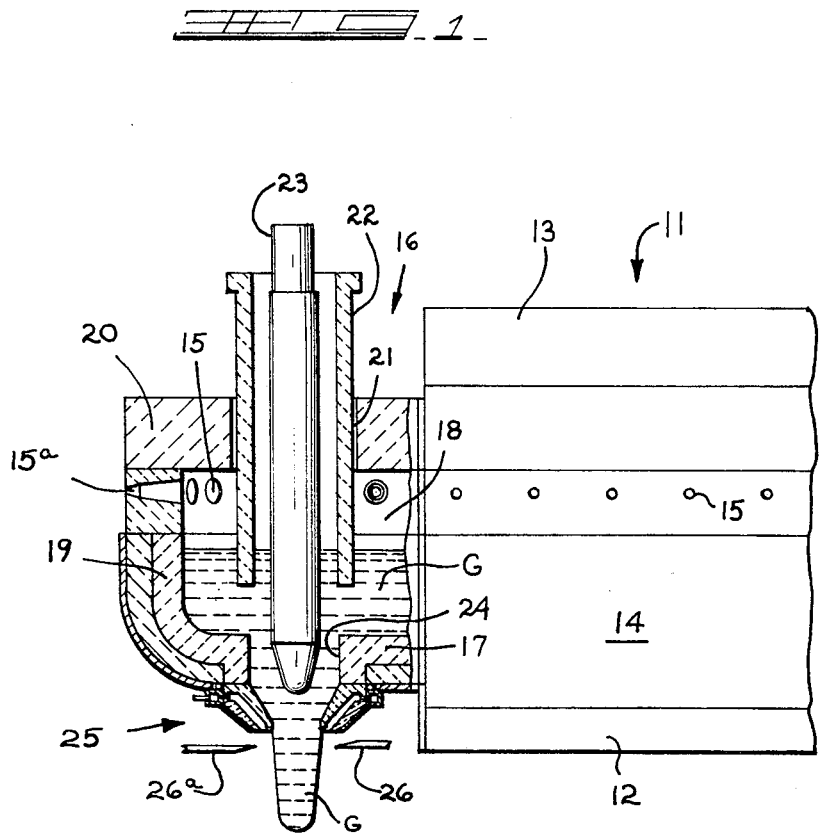
INVENTOR.
GEORGE E. KEEFER

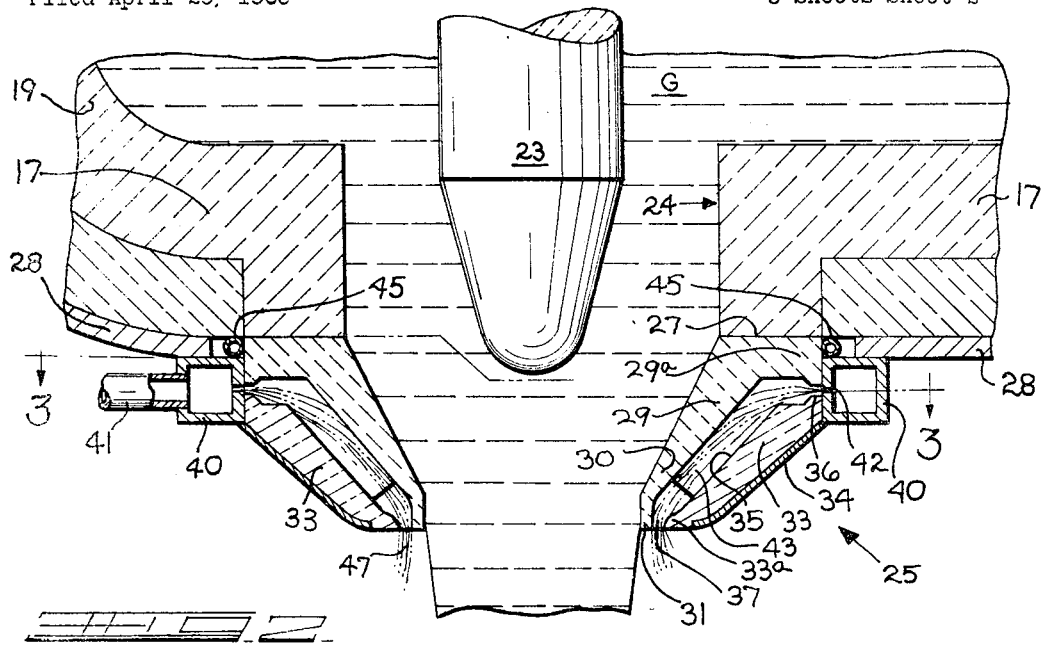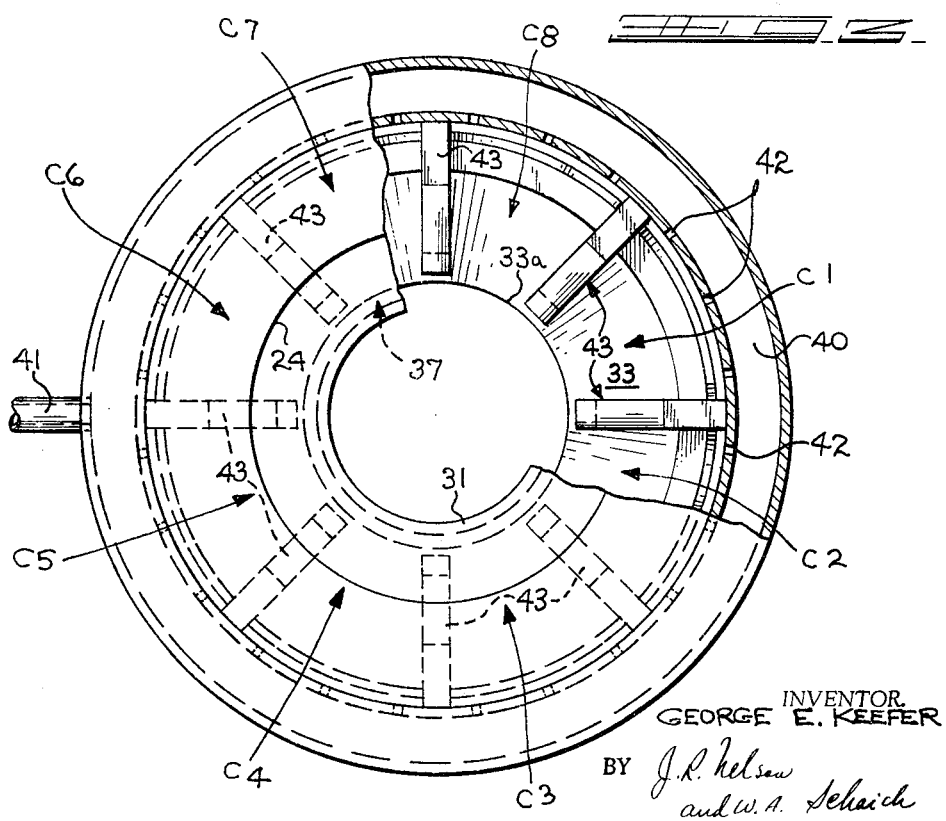

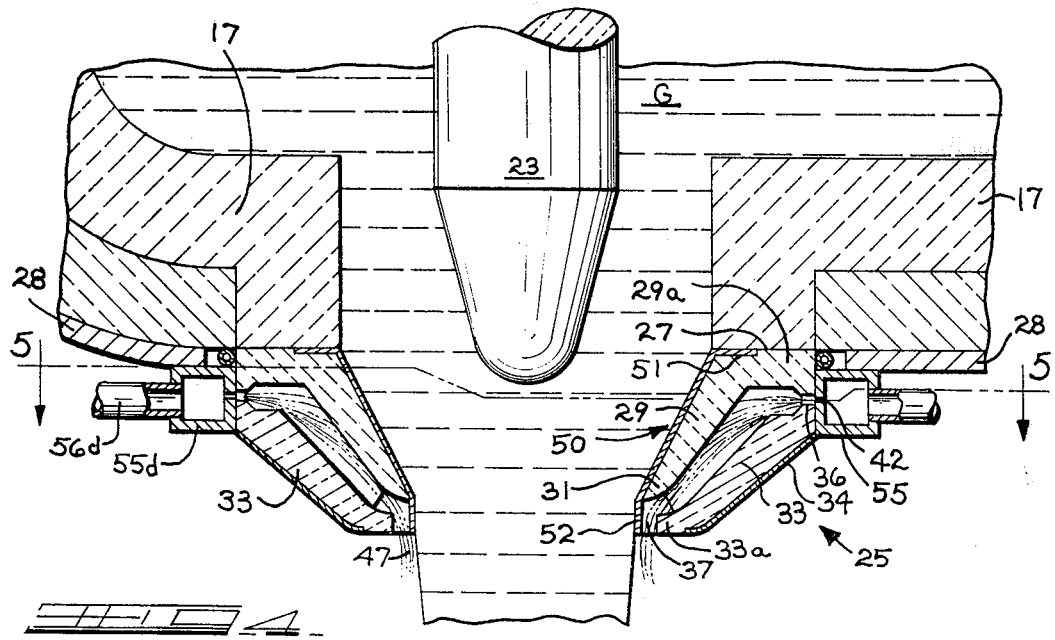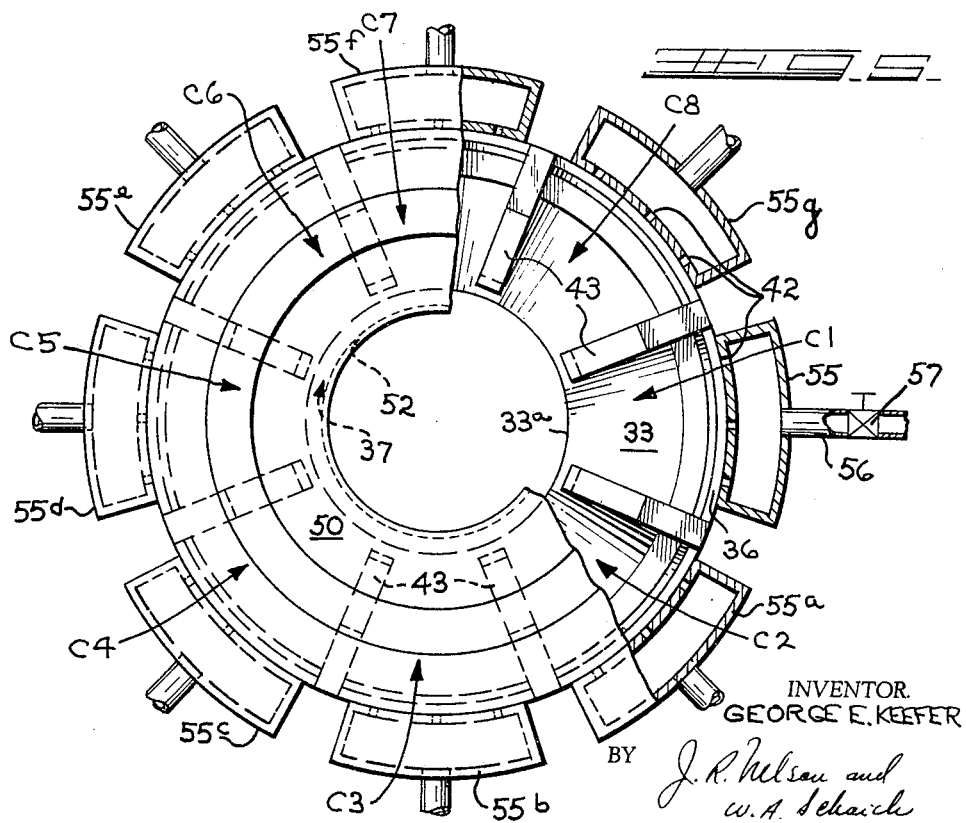

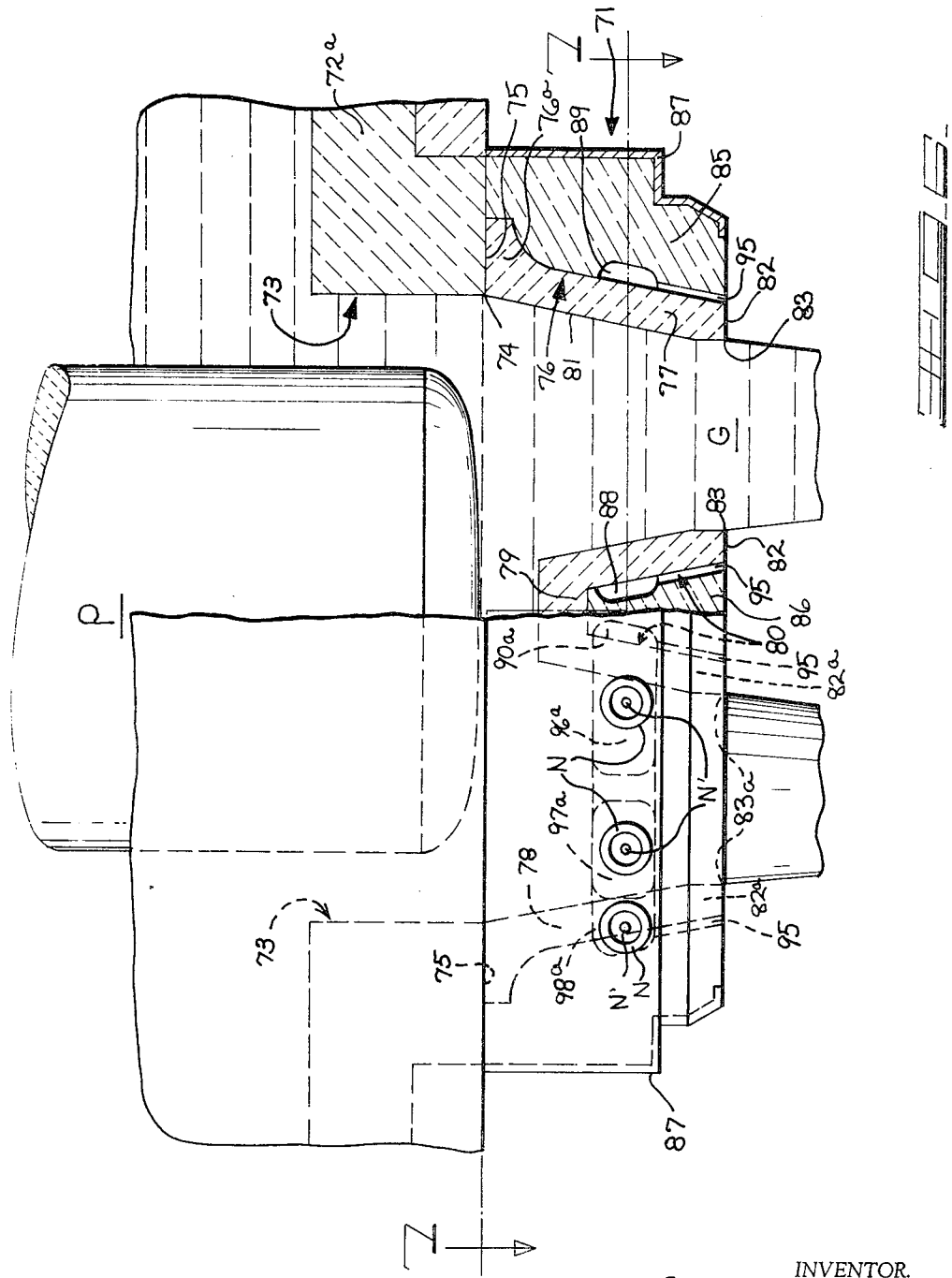

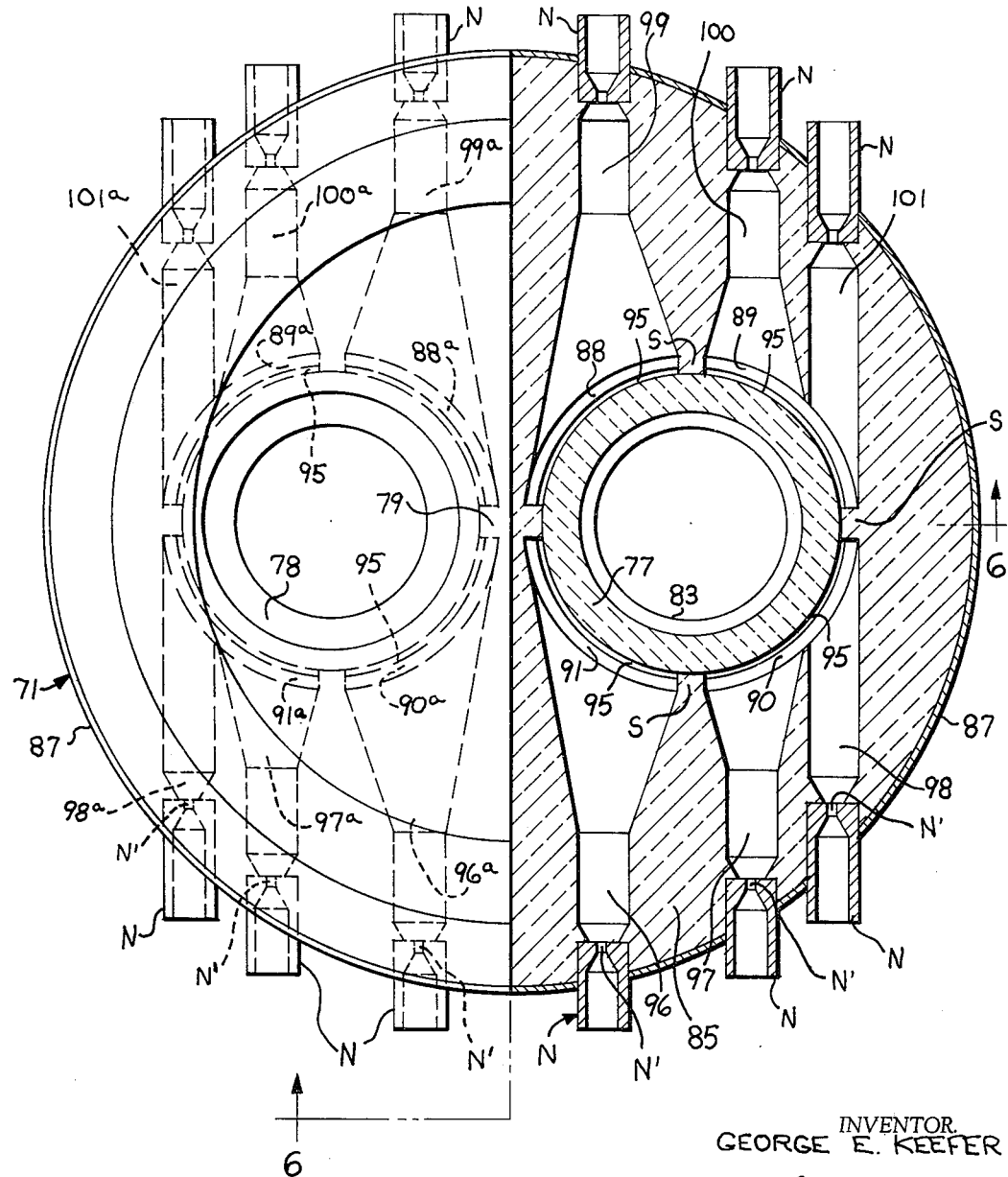

3,508,904
GLASS FEEDING ORIFICE WITH MULTICHAMBER COMBUSTION ZONES
George E. Keefer, Toledo, Ohio, assignor to Owens-Illinois, Inc., a corporation of Ohio
Filed Apr. 29, 1965, Ser. No. 451,935
Int. Cl. C03b 5/26
U.S. Cl. 65—326                                     4 Claims

ABSTRACT OF THE DISCLOSURE

In the feeding of molten glass, wherein a supply of melted glass is flowed to a feeder bowl, it is important to be able to control the temperature of the glass issuing from a discharge orifice positioned in the bottom of the bowl. Control of the temperature of the glass issuing from the discharge orifice is accomplished by having well-defined combustion zones surrounding the orifice with the burning of combustible gases within the combustion zones impinging flames on the exterior of the feeder orifice with the exhaust gases being guided so as not to impinge on the issuing glass. By providing a plurality of zones which are circumferentially spaced about the orifice, closer control of temperature distribution with respect to the cross-section of the issuing glass is accomplished.

---

The present invention relates generally to apparatus for delivering, e.g., "feeding," molten material to a forming operation. More specifically, the present invention relates to a delivery apparatus embodying novel improvements in construction having desirable effects upon the thermal character of the material delivered thereby as well as influencing the delivery rate.

With heat softenable materials, such as plastics and glass, it is common practice to first form a molten mass of the raw batch materials or reactants and thereafter convey the molten mass to a forming operation which, broadly considered, may be exemplified by such operations as extrusion, drawing, rolling, die forming, molding, etc. With many materials the thermal history, that is, the temperature vs. time relationship for each small increment of the molten mass as it passes from the primary furnace or molten supply to the ultimate room temperature article, is important in determining the properties, appearance and ultimate strength of the final article.

In the art of glass manufacture, glass batch raw materials are melted in a furnace at a given temperature and thereafter fed through a plurality of forehearth channels to a bowl-like delivery unit through which the glass may proceed by gravity as a drawn continuous stream or in intermittent gobs to the ultimate forming operation exemplified by the molding of glass bottles, tumblers, etc. The thermal history of the glass, as it proceeds through the bowl-like delivery unit, encounters the gob shearing device and thence falls into the mold, is extremely important. Devitrification may and does occur, leading to forming difficulties and "off ware." In fact, and variation in temperature, particularly as induced just prior to the molding or forming of the glass, has an important effect upon the formability and, as well, the properties and the appearance of the resultant glass article. The maintenance of proper temperature of the molten glass as it issues from the bowl is also extremely important with respect to maintenance of the proper weight of the gob charge. The careful control of the temperature at the delivery orifice is also important since the temperature of the molten material is directly related to the viscosity and, as a consequence, the rate of delivery of the glass, usually in the form of gobs. In fact, viscosity is of more importance in gob operations than in continuous streams, since the intermittent nature causes surface tension to become more of a factor.

A number of techniques involving modified delivery bowls and orifice rings are known in the art. Most of them, however, have been found to be deficient with respect to one or more of the problems hereinabove generally referred to. It has also been proposed heretofore to utilize an annular burner about the lower portion of the orifice ring in order to direct a radial flame against the orifice ring so as to reduce and/or prevent cooling due to loss of heat and consequent crystallization or devitrification of the glass emerging therefrom. This expedient has not proven satisfactory, however, since an uneven heating results, it is found, by reason of the necessity of maintaining the flame jets in an interrupted fashion in order to avoid deflection of the flame from the orifice ring against the mass of glass issuing through the orifice ring, thereby altering the shape and weight of the gob which, of course, is undesirable by reason of interference with subsequent forming.

With the foregoing introduction, it may be stated that it is a general object of the present inveniton to provide a delivery apparatus, in the nature of a modified orifice ring, for passage of molten material which is eminently more satisfactory in providing and maintaining uniformity of temperature than devices of various kinds known heretofore.

It is another object of the present invention to provide a delivery apparatus which, in operation, serves to prevent any undesired crystallization or devitrification of the glass at the bottommost discharge terminus of the orifice ring, thereby precluding entirely or substantially reducing defects otherwise occurring in the finished hardened, e.g., glass, article.

It is likewise an object of the present invention to provide an apparatus which permits the formation of a glass gob which is of higher temperature throughout and particularly of higher surface temperature than is achieved by the prior art arrangements.

It is yet another object of the present invention to provide an apparatus which is capable of feeding molten material, either continuously or as intermittent gobs, at a faster rate than heretofore.

It is another object of the present invention to provide a glass feeder apparatus which is inherently adaptable for quick start-up after any required or accidental period of shut-down.

With respect to a particular embodiment of the present invention involving a discharge opening definitive of a "multiple gob" formation, it is a further and additional object of the present invention to provide an improved temperature controlling arrangement in connection therewith which insures proper orientation of the gobs as they are formed, precluding separation and departure from optimum dropping trajectory as might otherwise result without temperature control about the "multiple gob" forming orifices.

It is also an object of the present invention, with reference to the "multiple gob" embodiment, to insure uniformity of weight control, faster gob delivery rates and elimination of ultimate shear mark; the latter being otherwise deleteriously imparted to the glass by reason of a chilling devitrification as, for example, by contact with the shear members.

The foregoing, as well as other objects of the present invention, will become apparent to those skilled in the art from the following detailed description taken in conjunction with the annexed sheets of drawings on which there are presented, for purposes of illustration only, the several preferred embodiments of the present invention.

In the drawings:

FIG. 1 is a side elevation view of a glass conveying forehearth channel terminating in a feeder bowl apparatus; the latter being shown in section to reveal the component parts of the construction representing the present invention.

FIG. 2 is an enlarged view of the lower portion of the feeder bowl embrasive of the discharge orifice ring and the modifications constituting the present invention.

FIG. 3 is, in general, a sectional view taken on the line 3—3 of FIG. 2, but with further portions broken away to show the internal construction of the heating arrangement representing a preferred embodiment of the present invention.

FIG. 4 is a view similar to FIG. 2, but illustrating a construction representing a preferred variant embodiment in accordance with the present invention.

FIG. 5 is, in general, a sectional view taken on the line 5—5 in FIG. 4, but with portions broken away for purposes of more clearly disclosing the internal construction of the orifice assembly in accordance with the present invention and particularly illustrating a still further preferred variant embodiment in accordance with the present invention.

FIG. 6 is a side elevation view, but with a section taken on the line 6—6 of FIG. 7 broken away for purposes of showing the interior details of a "multiple gob" orifice arrangement modified in accordance with a preferred embodiment of the present invention.

FIG. 7 is a sectional view taken on the line 7—7 in FIG. 6 and serving to amplify the disclosure of the constructional details of the embodiment shown in FIG. 6.

Basically, the present invention involves a feeder apparatus for molten material; said apparatus incorporating a heater arrangement for maintenance of a uniform temperature control and a higher temperature if desired over the entire discharge orifice surface and, at the same time, without interference with the molten material issuing therefrom whereby the above-enumerated objects are realized. The heater arrangement, more specifically considered, includes a combustion chamber or plurality of channels formed in surrounding relationship with the orifice ring.

In accordance with a further and more preferred embodiment of the present invention, the refractory orifice ring of downwardly convergent annular wall contour is provided with a thin facing of a heat conductive metal reducing the erosive and corrosive effect of the molten glass as it issues from the feeder. In particular, the facing liner may define a lower lip projecting vertically downwardly to intercept hot gasses and any residual flame from the downwardly convergent annular combustion chamber or channels. This latter embodiment constitutes a preferred construction since the lip is contacted by the hot gases as well as residual flame, serving thereby to conduct heat upwardly throughout the facing liner, thereby further raising the temperature of the glass as it passes downwardly along the liner surface.

Referring now more specifically to the drawings, there is disclosed in FIG. 1 a glass gob feeder 16 to which molten glass G is delivered by a forehearth channel 11 having a bottom wall 12, a top wall 13 and upstanding side walls 14 (only one of which is shown) which connect the bottom and side walls to define the channel. Burner ports 15 provide for issuance of jets of flame over the surface of the glass G proceeding therealong and into the feeder 16, which is shown in section in FIG. 1 for clarity of illustration. The delivery bowl 16, usually referred to as a feeder, is largely composed of refractory block elements definitive of a bottom wall 17, side wall 18, end wall 19 and cover wall 20. The side and end walls are also provided with ports 15a for issuance of flame over the top of the glass G. The upper wall 20 is apertured, as at 21, for reception of a hollow tube 22 projecting downwardly into the glass. This open-ended tube 22 surrounds a plunger or needle 23 axially and vertically reciprocally located therewithin, serving to control the passage of glass downwardly through an opening 24 formed in the bottom wall 17 of the feeder 16. Molten glass passes through the opening 24 to pass downwardly through an orifice ring element, generally designated as 25, and thence between opposed shears 26 and 26a controlled to reciprocate transversely and separate the glass portion G', the gob, from the molten glass mass thereabove into a gob which is appropriately conveyed to a forming apparatus, e.g., mold.

The lower portion of the feeder arrangement, and particularly of the orifice ring assembly 25, is shown in more detail in FIGS. 2 and 3; the description of which will now follow in which the same numerals will identify the same parts. The reference numeral 28 identifies the casing or bottom support member of the feeder arrangement 16. The opening 24 in the bottom wall is of cylindrical contour and extends to a bottom facing edge 27 of annular contour. This facing edge 27 has secured thereto, in facing engagement but downwardly dependent therefrom, an annular orifice ring 29 which is definitive of an upper lateral flange-like portion 29a in abutment with the facing edge surface 27 and a downwardly and inwardly projecting wall portion 30 which terminates in an annular lip 31. The glass contacts the wall 30 and lip 31 as it passes from the feeder. About the orifice ring 29, there is located a refractory wall ring 33 fabricated as a part of the orifice ring 30; the composite being held by an annular cup-like support 34. The fabricated orifice ring 29 and its wall ring 33 define passageways 35 which extend from the upper inlet 36 of reduced size to a restricted outlet 37 terminating at the lower lip 31 in the ring 29. An annular manifold member 40 surrounds the orifice rings 29 and 33. The manifold 40 includes a tubular inlet 41 on the outer side and is provided at its inner periphery, adjacent the rings 29 and 33, with a plurality of burner ports openings 42 which coincide with the restricted annular opening 36 to the passageway 35. Eight radial baffle-like spacer members 43 located within the annular passageway 35 insure proper spacing between the orifice ring 29 and the refractory wall ring 33 and, additionally, due to their radial disposition, serve to divide the passageway 35 into eight radially extending channels C–1 through C–8. A small tubular conduit 45 lies atop the manifold 40 in close proximity to the flange portion 29a of the orifice ring and the adjacent refractory components of the delivery bowl thereabove. A suitable coolant is circulated through this conduit to cool and solidify any glass that may tend to leak through the seams, between refractory components, preventing molten glass contact with the manifold 40.

In operation, a combustible fuel gas/air mixture is fed through the inlet 41 to the annular conduit 40 from which it proceeds through the plurality of jet openings 42 into the annular restricted opening 36 and thence into the eight channels C–1 to C–8 formed in the passageway 35. The flame which results from the combustion of the fuel gas/air mixture is directed laterally against the orifice ring 29, and particularly the flame is directed against the wall proximate the flange segment 30. Thence, as guided by the baffles 43, the flame proceeds inwardly and downwardly in radial fashion, heating the entire orifice ring 29. The waste gases of combustion thence proceed through the restricted opening 37 defined between the lip portion 31 of the orifice ring and the lowermost edge 33a of the refractory wall support 33, as indicated by the dotted lines referenced by numeral 47.

The actual operating interrelationship of the plunger 23 surrounding cylinder sleeve 22 and the shears 26 is not described herein since it is believed that the operation and cooperation of these elements is well-known as to the production of a "gob" for delivery to the forming operation by means of appropriate gob chutes, etc.

A discharge outlet orifice construction embodying several preferred manners of construction is shown in FIGS. 4 and 5. One aspect of the preferred embodiments illustrated in FIGS. 4 and 5 includes provision for a metal liner member 50 of inverted frusto-conical configuration mounted in covering relationship with the inner surface of the orifice ring 29. The metallic liner 50 has one end 51 formed into flange-like configuration which is sandwiched between the lower surface 27 of the refractory wall 17 and the upper flange 29a of the orifice ring 29. The opposite end of the member 50, identified by the reference numeral 52, is bent downwardly into depending relationship so as to project beyond the lip 31 of the member 29. The other constructional features of the discharge outlet construction disclosed in FIGS. 4 and 5 are essentially identical to the construction in FIGS. 2 and 3 and will not be repeated. Suffice it to say that, in accordance with the embodiment just described, the waste gases and residual flame proceeding radially inwardly along channels C-1 through C-8 formed in the convergent passageway 35 are directed against the depending lip 52 of the member 50 whereby the heat is transmitted quickly and uniformly upwardly throughout the vertical extent of the member 50 leading to maintenance of a higher temperature in the glass passing thereby. Additionally, the lip 52 in combination with the lip 33a formed on the refractory wall 33 defines a restricted annular exit 37.

With the construction as described, the heat generated, in the passageways 35 subdivided into radial channels C-1 to C-8, is passed to the liner 50 tending to thereby offset any radiation heat loss to the surroundings. Additionally, the liner 50 provides resistance to the erosive and corrosive effect of the moving glass at elevated temperature moving downwardly through the restricted outlet orifice.

The restricted annular exit 37 additionally serves to provide in combination with the elongate construction of the radial channels C-1 to C-8 for complete combustion of the inlet gases in the furtherest portions thereof remote from the gob forming orifice.

In accordance with another aspect of the present invention, provision is made for a plurality of manifolds 55, 55a, 55b, 55c, 55d, 55e, 55f and 55g, arranged radially about the orifice ring 29 and the encircling refractory wall 33 (see FIG. 5). These manifolds, 55 through 55g, are located to coincide respectively with the channels C-1 through C-8. Each of the manifolds 55 through 55g is provided with an independent inlet 56, valved as at 57 (only one shown) for independently controllable admission of a combustible fuel gas/air mixture to the interior of the manifolds. Each of the manifolds is provided with a plurality of jet orifices 42 which connect with the restricted opening 36, which in turn lead radially inward to the respective channels C-1 through C-8. With this preferred arrangement, improved control of the glass temperature is achieved since eight separate radial temperatures can be maintained. Accordingly, observation of the gob or performance of the gob in the forming operation may reveal a hot or cold spot at a particular peripheral location which can then be easily corrected by operation of the valve controlling combustion in a channel proximate the affected spot.

A discharge outlet apparatus construction embodying improved temperature control in accordance with the present invention and especially adapted for a so-called "multiple gob" feeding operation is illustrated in FIGS. 6 and 7. A feeder bowl 72 (FIG. 6) connected to a forehearth and a glass melting furnace (not shown) terminates in the orifice assembly 71. The feeder 72 includes a bottom wall 72a formed of refractory which defines the annular wall 73 having an inner surface of cylindrical contour terminating in a lower opening 74. A plunger P is located above and in axial relationship with the annular wall 73. The plunger is mounted for vertical reciprocation and in its downward path forces molten glass downward. The bottom wall 72a includes a downwardly facing surface 75, surrounding the opening 74, to which is secured the principal discharge orifice ring member 76. This double orifice ring 76 includes an upper flange segment 76a which abuts against the lower surface 75 of the bottom wall and encircles the principal aperture 74. The orifice ring 76 is definitive of a pair of depending, frusto-conical walls 77 and 78; the former of which is shown in vertical section in FIG. 6, and in transverse section in FIG. 7. The projections 77 and 78 are integrally connected by a web portion 79 provided with a downwardly opening notch 80 which is narrower at its upper reaches. The orifice ring 76 includes inner annular surfaces of convergent configuration and identified by the reference numeral 81 in FIG. 6. The projection 77 extends downwardly to terminate in the annular lip 82 definitive of glass discharge outlet 83. Likewise, projection 78 extends downwardly to terminate in an annular lip 82a definitive of an outlet 83a.

An enveloping refractory structure 85 comprises an outer refractory ring which fits up snugly about the integrally connected projections defining the double orifices. A web portion 86, integrally a part of the outer ring structure 85, fits up into the notch portion 80 of the double orifice ring 76. The upper surface of the member 85 is held in snug face-to-face surface abutment with the lower and outer surface of the ring 76 by the metal support member 87. The support member 85 contains four arcuate grooves 88, 89, 90 and 91 which together essentially encircle the frusto-conical projection of the orifice ring, e.g., 77; the grooves being separated at their ends by small web segments S. The same refractory outer ring 85 bears similar transverse arcuate grooves 88a, 89a, 90a and 91a which surround the frusto-conical projection of the other orifice of the ring 78. Each of the grooves, of which there are four about each orifice projection, connects fluidly with downwardly proceeding pathway which is radially coextensive with the groove, although somewhat smaller as viewed in vertical cross section (FIG. 6). These passageways are each identified by reference numeral 95. The grooves 88, 89, 90 and 91 and their passageways 95 are defined between the surface of the outer ring 85 and the outer surface of the double orifices 77 and 78. The refractory outer ring 85 is additionally formed to define twelve transverse tunnels, of which tunnels 96, 97 and 98 are representative (FIG. 7). Tunnels 99, 100 and 101 are generally identical to tunnels 96, 97 and 98, but 180° disposed. At its outer extremity, tunnel 96 sealingly connects with a nozzle N having an inner jet orifice N'. The outer end of the nozzle connects with an independently controlled inlet for introduction of a combustible fuel gas/air mixture. At its other end, the tunnel 96 flares out gradually to connect with the groove 91. Tunnel 97 connects at its outer end with the nozzle N similar to that described in connection with tunnel 96 and its inner end flares inwardly to connect with annular groove 90. Tunnel 98 connects at its outer end with a nozzle N and at its inner end also intersects with segmented annular groove 90. In like fashion, tunnel 99, which is diametrically opposed to tunnel 96, connects at its outer extremity with a nozzle N and its inner end connects with annular groove 88. Tunnel 100, which is diametrically opposed to tunnel 97, connects at its outer end with nozzle N and its inner end intersects fluidly with peripheral groove 89. Tunnel 101 is fitted at its outer extremity to a nozzle N and its inner extremity fluidly intersects with annular groove 89. By reference to FIG. 7, it can be seen that a combustible gas can be introduced through the plurality of nozzles N to the tunnels 96, 97, 98, 99, 100 and 101, which, in effect, radially surround the projection 77 which defines the glass outlet 83. The flame proceeds (not radially) inwardly within the tunnels to impinge onto the outer wall of the orifice ring 76, whereupon the waste gases proceed downwardly and are exhausted to atmosphere through the annular exit paths 95, respectively coextensive with the grooves 88, 89, 90 and 91. Both of the orifice openings are similarly heated by reason of the similarity of construction of tunnels 96a, 97a, 98a, 99a, 100a and 101a and grooves 88a, 89a, 90a and 91a, each connecting with an exit path 95. By reason of a construction, as just described, the flame and hot combustion gases effectively surround the outer surface of the wall of each of the orifices discharging streams of molten glass from the feeder. The disclosed apparatus as operated provides effective peripheral control of temperature of each of the glass streams issuing from the two orifices 83 and 83a of the orifice ring 76. Particularly is this so when there is considered the segmented heating arrangement provided by the plurality of tunnels projecting inwardly from the nozzles N to fluidly intersect the grooves 88, 89, 90 and 91 which are essentially independent. Accordingly, as with previously described embodiments, a desired temperature can, in effect, be effected for any segmented portion of the peripheral surface of the glass gob about to be formed. This feature is particularly important with respect to the "double gob" operation illustrated in FIGS. 6 and 7 and as described hereinabove. Thus, with the construction as herein described, it has been found that the gob separation and falling trajectory, once separation from the orifices (83 and 83a) has occurred, is controllable in terms of smoothness of operation to a much greater degree than known heretofore. In the past, "double gob" operations have necessitated the use of a cooling tunnel in between the two discharge orifices in order to overcome the natural tendency of an overheating in the regions where the gobs are closest together. The latter, if uncorrected, provided a region of greater fluidity at the region at which the gobs were closest, as compared to the outer regions on opposite sides of the individual gobs. By reason of this construction, the individual gobs can be peripherally maintained at a uniform temperature independently whereby no cooling is necessary. In addition to insuring a free falling gob unaffected by variations in viscosity as controlled by variant temperature about the periphery of the gob, uniformity of gob weight is more assured. It has also been found with the arrangement as just described that the gob surface temperature can be controlled at a level that is substantially hotter than heretofore possible. This feature has collaterally resulted in a production rate which is substantially faster than heretofore. Since the peripheral segments are individually controllable by reason of the construction in accordance with this invention, any observable differences in the gob, or as determined by examination of the finished ware, can almost immediately be corrected by appropriate control of the fuel gas/air nozzle. It will be appreciated, of course, that in certain cases it can even be found desirable to introduce a cooling air into the tunnels.

I claim:

1. A glass feeder orifice ring assembly comprising, a ceramic orifice ring of substantially frusto-conical configuration forming a downwardly converging discharge orifice, an annular wall member positioned juxtaposed said ring and having an internal configuration substantially paralleling the external surface of said orifice ring forming therebetween a downwardly inclined annular chamber, a plurality of vertically positioned baffle members extending between said orifice ring and said wall member dividing said annular chamber into a plurality of sectors, said orifice ring and wall member being relatively spaced at their upper end so as to provide a restricted, annular inlet, and relatively spaced at their lower end to form an annular exhaust passage, manifold means surrounding said ring and wall member and effectively closing said annular inlet, means for supplying a combustion gas to said manifold means, and means formed in said manifold for directing said combustion gas into said annular inlet whereby said gas burns within said chamber and exhausts downwardly through said exhaust passage.

2. The apparatus of claim 1, wherein said manifold means comprises a plurality of arcuate manifold members with a member corresponding to each sector, and said means for supplying gas to said manifold is individually selective with respect to each manifold member, whereby control of heating may be affected circumferentially of said orifice ring.

3. A glass feeder orifice ring assembly comprising, a ceramic orifice ring of substantially circular, upper configuration and having at least one frusto-conical, downwardly converging annular discharge orifice, an anular wall member positioned juxtaposed said ring and having an internal configuration substantially paralleling the external shape of said orifice ring, said wall member having its internal wall relieved at circumferentially spaced areas facing the upper portion of said discharge orifice forming therebetween a plurality of chambers, a plurality of passageways extending from the exterior of said wall member into communication with said chambers, said orifice ring and wall member being relatively spaced at their lower end to form an annular exhaust passage surrounding said annular discharge orifice, means supplying a combustion gas to said passageways, whereby said gas burns within said chambers and exhausts downwardly through said exhaust passage.

4. The apparatus of claim 3, wherein said orifice ring is formed with a plurality of frusto-conical, downwardly converging, annular discharge orifices and said wall member substantially surrounds said discharge orifices and forms a plurality of chambers therearound.

References Cited

UNITED STATES PATENTS

| 1,401,922 | 12/1921 | Peiler | 65—128 |
| 1,583,932 | 5/1926 | Keller | 65—326 XR |
| 1,788,413 | 1/1931 | Steimer | 65—326 |
| 1,942,035 | 1/1934 | Miller et al. | 65—128 XR |
| 2,020,143 | 11/1935 | Haub | 65—326 XR |
| 1,556,381 | 10/1925 | Troutman et al. | 65—128 XR |

FOREIGN PATENTS

| 768,938 | 2/1957 | Great Britain. |

FRANK W. MIGA, Primary Examiner

U.S. Cl. X.R.

65—128